(12) United States Patent
Hoffacker

(10) Patent No.: US 12,117,207 B2
(45) Date of Patent: Oct. 15, 2024

(54) DUCTED ROOM AND SHOWER HEATING SYSTEM

(71) Applicant: Andrew Hoffacker, Orlando, FL (US)

(72) Inventor: Andrew Hoffacker, Orlando, FL (US)

( * ) Notice: Subject to any disclaimer, the term of this patent is extended or adjusted under 35 U.S.C. 154(b) by 729 days.

(21) Appl. No.: 17/332,271

(22) Filed: May 27, 2021

(65) Prior Publication Data

US 2022/0381478 A1  Dec. 1, 2022

(51) Int. Cl.
| | | |
|---|---|---|
| *F24H 3/02* | (2022.01) | |
| *F24H 9/00* | (2022.01) | |
| *F24H 9/20* | (2022.01) | |
| *G08C 17/02* | (2006.01) | |

(52) U.S. Cl.
CPC ........... *F24H 3/022* (2013.01); *F24H 9/0073* (2013.01); *F24H 9/2071* (2013.01); *G08C 17/02* (2013.01); *F24H 2250/02* (2013.01)

(58) Field of Classification Search
CPC .... F24H 2250/02; F24H 3/022; F24H 9/0073; F24H 9/2071; G08C 17/02; Y02B 30/00
USPC .......................................................... 392/360
See application file for complete search history.

(56) References Cited

U.S. PATENT DOCUMENTS

| | | | |
|---|---|---|---|
| 2,724,044 A | 11/1955 | Campbell | |
| 2,861,598 A | 11/1958 | Carder, Jr. et al. | |
| 3,133,535 A | 5/1964 | Blumenshine | |
| 3,449,838 A | 6/1969 | Chancellor | |
| 3,731,056 A * | 5/1973 | Becker | F24H 3/0405 392/350 |
| 4,950,871 A | 8/1990 | Pollak et al. | |
| 8,467,668 B2 | 6/2013 | Searle et al. | |
| 9,638,463 B2 | 5/2017 | Cross et al. | |
| 2005/0000681 A1* | 1/2005 | Gagnon | F04D 25/166 165/66 |
| 2005/0111840 A1* | 5/2005 | Craw | F24H 3/0411 392/350 |
| 2011/0079653 A1* | 4/2011 | Griffin | F23N 1/022 110/191 |
| 2013/0213952 A1 | 8/2013 | Boutin et al. | |

* cited by examiner

*Primary Examiner* — Sang Y Paik
(74) *Attorney, Agent, or Firm* — Jason T. Daniel, Esq.; Daniel Law Offices, P.A.

(57) ABSTRACT

This heating system consists of a ceiling or wall mounted housing containing a fan, motor, electric heater and optional controller which connects to a discharge vent via a duct which can all fit within a wall. It has primary usages as a room or shower heater where it can be recessed into a wall or ceiling where it intakes air from the room, heats it and routes it through an insulated duct in the wall and vents it back into the room near the floor. In a shower, the heater can be located high on the wall or in the ceiling away from the shower to keep it away from splashed water. Additionally, the heater and vent can both be mounted in the ceiling where the heater is outside the shower and the vent is in the shower. It can be controlled by a switch, wired thermostat or wireless remote.

14 Claims, 4 Drawing Sheets

DUCTED ROOM AND SHOWER HEATING SYSTEM

TECHNICAL FIELD

The present invention relates generally to heating and ventilation devices, and more particularly to a wall or ceiling mounted ducted heating system.

BACKGROUND

The statements in this section merely provide background information related to the present disclosure and may not constitute prior art.

There are many known types of electric heaters that are designed to provide auxiliary heat for individual rooms or spaces within a house. Such units typically include a compact portable housing that has an internal fan and heating element. These units are designed to sit on the floor and have an elongated power cord for receiving power from a nearby receptacle.

Although useful in certain instances, these devices are not suitable for use in many locations such as bathrooms or shower stalls due to the danger of water exposure. Additionally, because these units operate close to the ground, they are unable to capture the hot air located adjacent to the ceiling and recirculate the same throughout the room.

Accordingly, it would be beneficial to provide a wall or ceiling mounted ducted heating system that does not suffer from the drawbacks described above.

SUMMARY OF THE INVENTION

The present invention is directed to a wall or ceiling mounted heating system. One embodiment of the present invention can include a heating device having an internally located centrifugal fan, at least one heating coil, and a controller. The main body can include a discharge vent that is connected to an elongated insulated duct having a supply vent along a distal end.

The main body can include a compact construction and hardware for being secured onto a wall stud or drywall with the main body located the wall structure drywall. The duct and supply vent can also include cross sectional dimensions that are suitable for placement within the wall structure behind the drywall.

In one embodiment, a remote thermostat can be in wireless communication with the heating device. In another embodiment, a remote application for execution on a processor enabled device can also be in wireless communication with the heating device.

The preferred configuration of the heating unit consists of a squirrel cage fan/blower that intakes air through a louvered cover and pushes the air through electrical heating elements and discharges the air into an insulated duct where the air then flows back into the room through a vent. The fan can be single speed or have multiple speeds. A thermal switch can be placed near the heating elements to protect the system from excess temperature in the event of a motor failure or obstruction. Heat can be kept away from the outer housing by an air gap and/or insulation. The air gap around the heater can have bypassed air flowing through the air gap to keep the housing cool. The heat can come from a single element with an on/off switch or utilize a voltage regulator to control the wattage. The heating unit can also use multiple elements that can be switched on and off separately to vary the heat output (example: 250-, 500- and 1000-watt elements that could provide various heat levels up to 1750 watts). The operation of the heater can be controlled through an on/off switch or use a wired or wireless thermostat/controller. The wireless operation could be controlled through a smartphone application. The heater and duct are fully contained within the wall or ceiling. The only exposed parts are the louvered cover over the heater assembly and the vent(s).

In one embodiment as a room heater, the heating unit is installed in the wall next to the ceiling. The heating unit fits into a standard 2×4 stud wall. The heating unit intakes the air near the ceiling where the air is the warmest and heats the air with electric heating elements and sends the air through an insulated duct inside the wall and out one or more vents near the floor. This promotes circulation and a more even heat distribution while not taking up any floor space.

In another embodiment as a shower heater with a wall mounted vent, the heating unit can be mounted on either the ceiling or wall in a safe location away from splashed water. The preferred location would be outside of the shower, but the heating unit could be mounted in the wall of the shower if the shower has a high ceiling. The heating unit could utilize a GFCI breaker as required. The shower heater will operate in the same manner as the room heater described above. For ceiling mounting, the duct would go through the top plate of the wall. Steel reinforcement can be added to the top plate for additional strength as required. The return vent could be made of porcelain, metal, plastic, fiberglass or any other material and can be surface mounted where the exposed portion of the vent is in front of the surface, or the vent could be recessed and have tiles installed around the vent. For vents made of porcelain or other brittle materials, a piece of tubing could be installed inside the vent to allow attachment of the duct. Various inserts could be installed inside the vent to direct the air to the desired location (left/right, up/down) or to concentrate or disperse the air.

In another embodiment as a shower heater with a ceiling mounted vent, the heating unit can be mounted in the ceiling outside of the shower and away from splashed water and the vent would be mounted in the ceiling inside the shower. A surface mounted duct can also be used in the shower to move the hot air from the ceiling vent to down near the floor. This would simplify installation while moving the heat near the floor to take full advantage of convection. The duct would have an open top for the heated air to enter from the ceiling mounted vent and have a vent near the bottom of the duct to discharge the heated air near the bottom of the shower. The duct can be permanently mounted to the wall with adhesives or temporarily mounted with suction cups or hook and loop fasteners and the duct can have shelves to add functionality.

This summary is provided merely to introduce certain concepts and not to identify key or essential features of the claimed subject matter.

BRIEF DESCRIPTION OF THE DRAWINGS

Presently, a preferred embodiment is shown in the drawings. It should be appreciated, however, that the invention is not limited to the precise arrangements and instrumentalities shown.

DETAILED DESCRIPTION OF THE INVENTION

Figure 1:
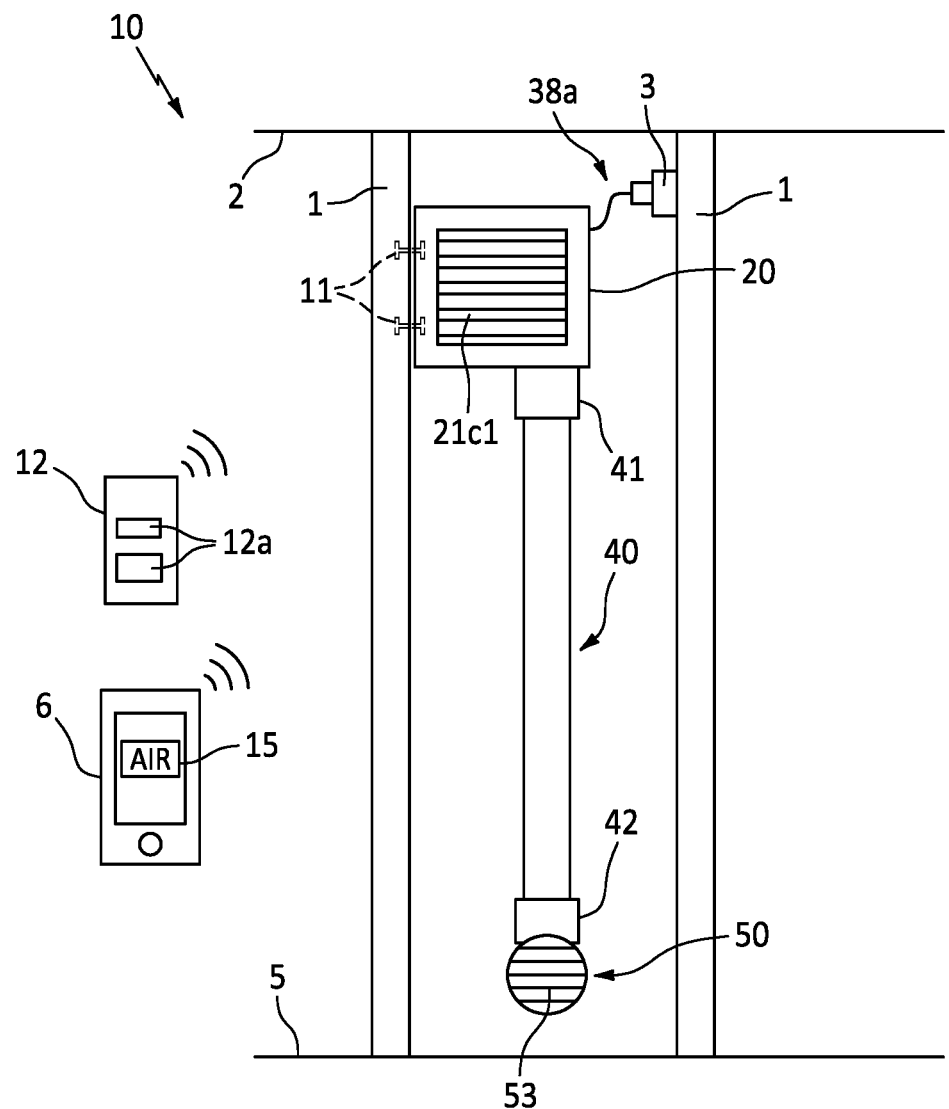
FIG. 1 is a frontal view of one embodiment of a wall mounted ducted heating system in operation, with the drywall on the building wall removed for ease of illustration.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

The term "drywall" is used as a generic term for wallboard and can include any type of wallboard.

As described herein, a "unit" means a series of identified physical components which are linked together and/or function together to perform a specified function.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples include opposing strips of hook and loop material (i.e., Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4 illustrate one embodiment of a wall mounted ducted heating system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown throughout the drawings, the wall mounted ducted heating system 10 can include a heating unit 20 an elongated air duct 40, a return vent 50, and a remote operation device 15.

Figure 2:
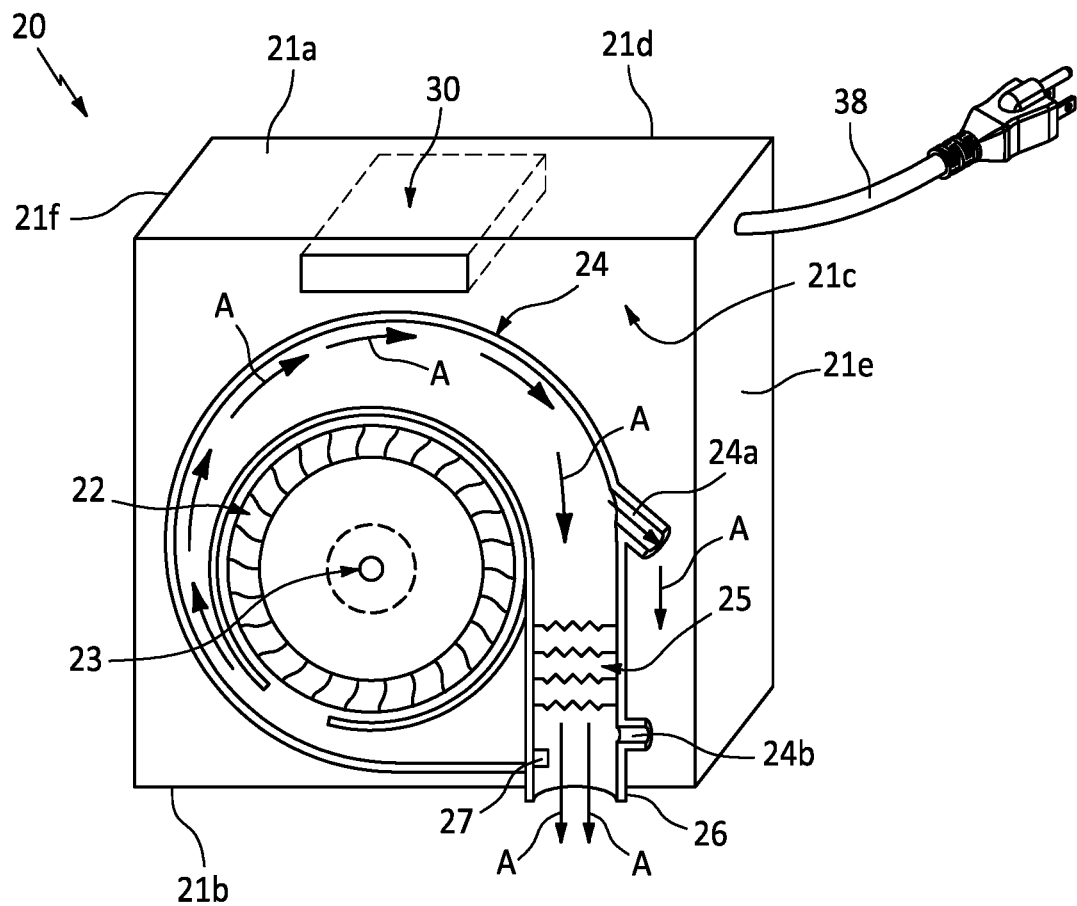
FIG. 2 is a perspective view of the heating unit of the wall mounted ducted heating system, in accordance with one embodiment of the invention.

As shown best at FIG. 2, one embodiment, the heating unit 20 can include a main body having a top end 21a, a bottom end 21b, a front end 21c, a back end 21d and a pair of sides 21e and 21f that define a hollow interior space. In one embodiment, the front end 21c can be partially or fully open —i.e., air input section—so as to allow access to the interior space and can be engaged by removable cover panel 21c1 (see FIG. 1), which can have any number of slats/openings for permitting air to enter the device housing.

As described herein, the main body and cover may be formed from materials that are, for example, relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.). Although illustrated with regard to a generally rectangular-shaped member, this is for illustrative purposes only, as the main body can be constructed to include any number of different shapes and sizes.

In the preferred embodiment, the main body will be constructed so as to engage a wall stud 1 so as to be positioned adjacent to the ceiling 2 of a room. In this regard, the main body can include any number of brackets and/or openings for engaging connectors 11 such as nails, screws, or other such hardware, for example, in order to allow the main body to be mounted thereto. The main body can also be mounted directly to the drywall in various ways. One such way could be to include a small flange on the front edge of the housing (21a, 21b, 21e and 21f) to engage the outside of the drywall while a mechanical connector engages the back side of the drywall from within the housing. Of course, other embodiments are contemplated wherein the main body includes functionality for being mounted onto, along or within a wall structure of a building at any number of user-selected locations.

In one embodiment, the heating unit 20 can include a fan 22 and electric motor that are positioned within the main body. The motor 23 can include, comprise or consist of any type of AC or DC powered motor, and can be communicatively and electrically linked to the below described controller 30, which can control an operation of the motor to spin the fan 22 so as to produce airflow through the system. The fan and motor can be mounted in accordance with any mounting characteristics as are known in the art.

In the preferred embodiment, the fan 22 can comprise a centrifugal fan wheel 22 (also referred to as a squirrel-cage fan). As is known in the art, centrifugal fans move air radially thus the direction of the outward flowing air can be changed by 90 degrees. Owing to the fact that the heating unit 20 is designed to be mounted within a wall structure behind or flush with the drywall 4 (See FIG. 4), the compact design and operation of the centrifugal fan is preferred, so as to achieve an overall main body depth (e.g., distance between front end 21c and back end 21d) of less than 4 inches. Of course, other embodiments are contemplated wherein a different type of electric fan structure and/or main body depth are utilized. Any type of fan or device for moving air can be used for fan 22.

As shown, an air guide 24 can be positioned about the fan 22, so as to direct the airflow A generated by the fan through a series of heating coils 25 and out of the discharge vent 26. The heating coils 25 can be communicatively and electrically linked to the below described controller 30, which can control an operation of the same. As described herein, the heating coils can include, comprise or consist of any type of commercially available heating coils, ceramic elements or anything else capable of producing heat from electricity, and may also include various voltage regulators and other such components. As is known in the art, heating coils receive electrical current from a power source (e.g., power unit 38) and convert the electric energy into heat energy. As the air A passes over the coils, heat is absorbed into the air and discharged through the vent 26.

In one embodiment, the air guide 24 can include a plurality of openings 24a and 24b which can be positioned along either end of the heating coils 25. The opening(s) 24a can function to allow a portion of the non-heated air to bypass the heat coils and to circulate along the inside facing surface of the main body before being discharged by the vent 26 via opening(s) 24b. Such a feature advantageously creates an air gap of cool air along the inside of the main body to prevent the main body itself from becoming heated by the operation of the heat coils.

In one embodiment, a temperature sensor 27 can be positioned adjacent to the heating coils 25 and can be communicatively linked to the below described controller. The temperature sensor can function to report a temperature of the air output of the device 20 and the coils 25 themselves, so as to allow the controller to adjust system operation. In this regard, the system controller can function to shut the coils off in the event they reach a temperature beyond a preset threshold (e.g., over 150° F.), and/or regulate the temperature of the coils or fan to achieve a user-specified room temperature (e.g., 79° F.).

Figure 3:
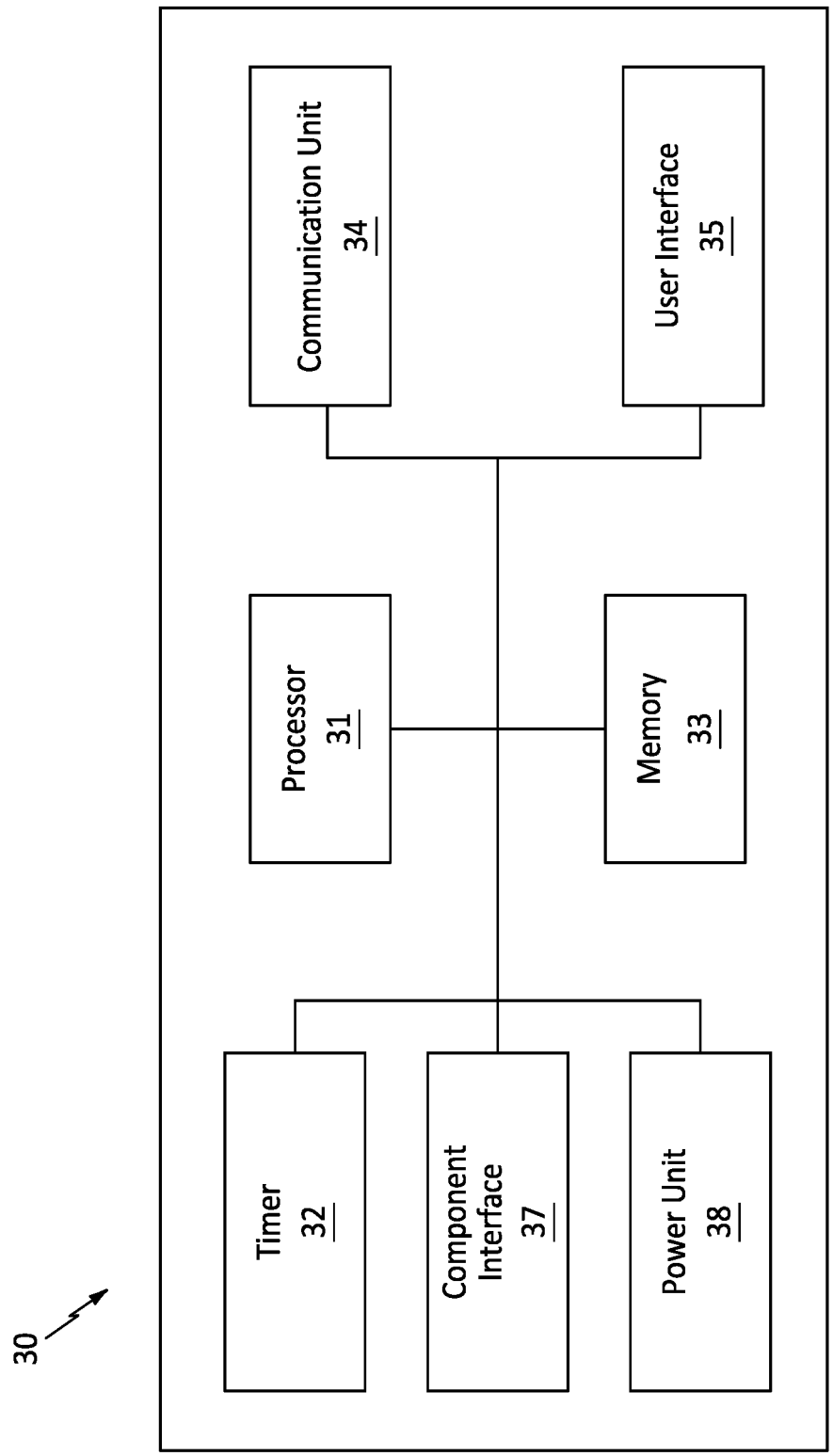
FIG. 3 is a simplified block diagram of the internal controller of the heating unit of the wall mounted ducted heating system, in accordance with one embodiment of the invention.

FIG. 3 illustrates one embodiment of a controller 30 which can be positioned within the main body of the heating unit 20. In one embodiment, the controller 30 can include a processor 31 that is conventionally connected to a timer module 32, an internal memory 33, a communication unit 34, a user interface 35, a component interface 37, and/or a power unit 38.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 31 can include one or more central processing units (CPU) or any other type of device, or multiple devices, capable of manipulating or processing information such as program code stored in the memory 33 in order to allow the device to perform the functionality described herein.

Likewise, a timer module 32 can be provided, and can function to accurately measure the passage of time. As described herein, the timer module can be provided as a function of the processor or can include a separate physical circuit. In either instance, processors and timers are extremely well known in the art, therefore no further description will be provided. The inclusion of an integrated timer can be a safety feature for preventing ongoing operation of the device beyond a predetermined threshold such as 2 hours, for example.

Memory 33 can act to store operating instructions in the form of program code for the processor 31 to execute. Although illustrated in FIG. 3 as a single component, memory 33 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a solid-state hard drive, for example.

The wireless communication unit 34 can include any number of discrete or integrated components capable of sending and/or receiving electronic signals with another device, either directly or over a network. In one embodiment, the communication unit 34 can include a radio transceiver for communicating with a remotely located device such as the wireless thermostat device 12 illustrated at FIG. 1, for example. As shown, the wireless thermostat 12 can include any number of buttons 12a for allowing a user to selectively activate the fan and/or heating elements of the heating unit 20, in order to turn the system between an ON or OFF operating state, and/or adjust the temperature of the room, for example.

In another embodiment, the wireless communication unit 34 can include a WiFi or Bluetooth transceiver for communicating wirelessly with a remotely located user interface device such as the smartphone 6 running a mobile application 15 illustrated at FIG. 1, for example. Of course, any number of other transmission and reception mechanisms and protocols can also be utilized herein.

As described herein, the mobile application 15 (i.e., ducted heating system application) can be any set of programmatic instructions that can be loaded onto any type of processor enabled device such as the illustrated smartphone 6, personal computer, laptop, or smartwatch, for example. The App can include program language for execution on the device that enables a user of the device to interact with the controller 30 in order to send and receive information such as to turn the system ON, OFF, and/or adjust the temperature of the room, for example.

The user interface 35 can be hard wired to the heating unit 20 and can function to accept user inputs and/or to provide operating information to a device user. In one embodiment, the user interface can be positioned anywhere along or within the main body itself; whereas other embodiments are contemplated wherein the user interface can be connected to the main body via an elongated wire, so as to operate as a thermostat that can be positioned on or along the wall where the device is installed.

In either instance, the user interface can include or control one or more buttons/switches, that are connected to the processor so as to activate various programmatic functions such as those described above with regard to the wireless thermostat or mobile application, for example.

The component interface 37 can function to provide a communicative link between the processor 31 and various system elements such as the fan motor 23, heating coils 25, temperature sensor 27 and/or the user interface 35, for example. In this regard, the component interface unit can include any number of different components such as one or more PIC microcontrollers, bus cables, and/or cable connectors (e.g., com port, USB port), among other types of known communication hardware capable of engaging any number of communication cables and device(s).

In one embodiment, the power unit 38 can include an A/C electrical power transformer and cord 38a capable of allowing the device to be powered from a standard electrical outlet 3 such as the GFCI outlet illustrated at FIG. 1, for example. The heating unit can also be directly hardwired. The power unit can include functionality for receiving, regulating and outputting power as necessary to operate each of the system components.

Figure 4:
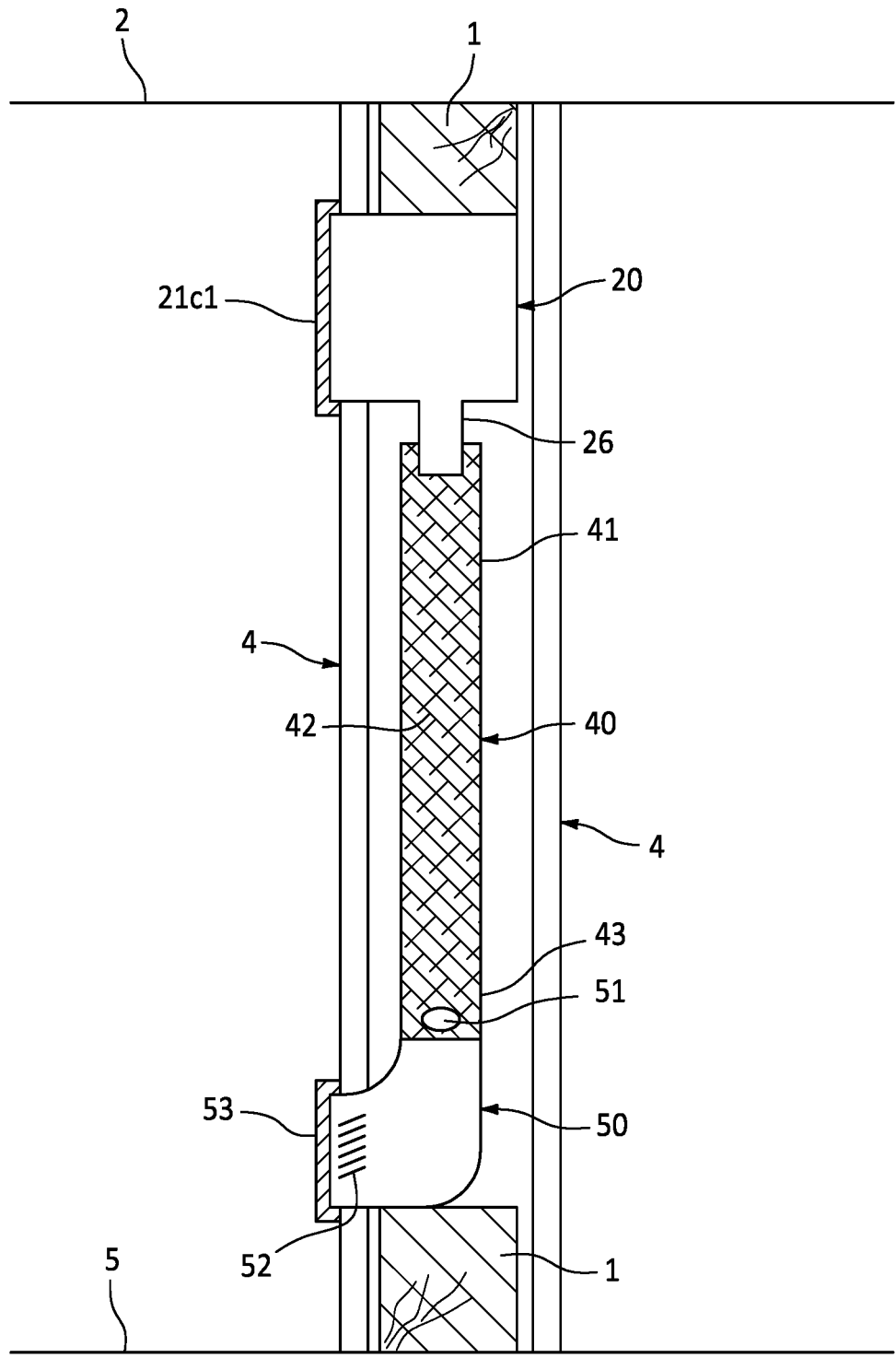
FIG. 4 is a side view of the wall mounted ducted heating system in operation, in accordance with one embodiment of the invention.

As shown best at FIG. 4, the supply end 41 of the air duct 40 can be secured onto the discharge vent 26 of the heating unit 20. As described herein, the air duct 40 can include an elongated generally hollow and tubular shaped member that is constructed from corrugated and flexible sheet metal. In the preferred embodiment, the air duct can include an outer layer of insulated material 42 such as wrapped cotton, fiberglass, or plastic, as is known in the art, for example, and can include an outside diameter of 3" to 3.5" so as to easily fit behind the drywall of a building wall structure that is traditionally 3.5 inches thick. Of course, any number of other construction materials, insulative materials, shapes, sizes and lengths are also contemplated.

The supply vent 50 can include an opening 51 that is connected to the discharge end 43 of the air duct 40 and can receive heated air therefrom. The supply vent can preferably include a generally cured shape having a discharge opening 52 along the opposite end. In one embodiment, a supply vent panel 53 can have any number of slats/openings can be removably engaged to the vent 50 for permitting the heated air to exit. As shown, the discharge vent can be secured to the drywall or to a wall structure behind the drywall and preferably at a location near the floor 5. Of course, other locations are also contemplated.

As noted above, the heating unit 20 can be mounted onto a stud 1 or other wall structure and the duct 40 and vent can be positioned generally parallel to the stud along the wall, so as to be located behind the drywall panels. In the preferred embodiment, the only portion of the system hardware that will be visible after installation will be the panels 21c1 and 53, so as to provide an aesthetically pleasing and minimalistic overall look.

In either instance, the system 10 and installation in the manner herein described has several advantages over portable heaters. For example, because the system can be installed behind the drywall and/or tile walls, the system can be safely installed in a shower or other wet environment without risk of injury or electrocution to a user. Moreover, because the air intake portion of the fan 22 is located in or near the ceiling 2, the system takes the warmest air in the room (because hot air rises) and redistributes the same near the floor where the occupants are. As such, the system does not need to work as hard to heat the air because it is already warmer than the air is where it is being distributed.

While this system has been described with the unit directly intaking air from the room and discharging out the vent hose, the system can also operate in reverse with the air intake through the vent at the end of the hose and discharging at the heating unit allowing the heating unit to be placed below the vent at the end of the hose.

Another configuration of this system would be to use the open space in the stud wall as the duct for either the supply or discharge side of the heater. This could provide simplified installation if the wall cavity is used as the intake duct to intake warm air near the ceiling. The heater could be placed near the floor and discharge directly into the room. This would keep all the advantages of the heating system without having to install a duct into the wall.

Of course, other embodiments are contemplated wherein the heating unit 20, duct 40 and vent 50 can be hung along the outside portion of a room's drywall or other exterior surface (e.g., brick or plaster). In such situations, the mounting hardware can be located along the back of the components, and any number of decorative sleeves or other such covers can be provided to aid with aesthetics. In one such embodiment (not illustrated), optional shelving can be provided so as to hide the appearance of the components.

As described herein, one or more elements of the wall mounted ducted heating system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:
1. A heating system, comprising:
   a heating device having a main body with an air input section and a discharge vent;
   a connector that is positioned along the main body, said connector including functionality for securing the main body onto a building wall;

a fan that is positioned within the main body;
an electric motor that is positioned within the main body and connected to the fan;
an air guide that is positioned adjacent to the fan, said air guide functioning to direct an airflow generated by the fan to the discharge vent;
at least one heating coil that is positioned within the air guide at a location adjacent to the discharge vent;
an air outlet opening that is positioned along the air guide at a location between the fan and the at least one heating coil;
an air inlet opening that is positioned along the air guide at a location between the at least one heating coil and the discharge vent;
an air duct that is connected to the discharge vent; and
a supply vent that is connected to the air duct,
wherein the air outlet opening is configured to direct a portion of the generated airflow into the main body, and the air inlet opening is configured to discharge the portion of the generated airflow out of the discharge vent.

2. The system of claim 1, wherein the fan comprises:
a centrifugal fan wheel.

3. The system of claim 2, wherein the main body includes a dimension that is suitable for being positioned within the building wall.

4. The system of claim 2, wherein the main body includes a depth of less than six inches.

5. The system of claim 2, wherein the air duct includes an outside diameter that is suitable for being positioned within the building wall.

6. The system of claim 5, wherein the air duct includes an outside diameter that is less than 4 inches.

7. The system of claim 6, wherein the air duct is insulated.

8. The system of claim 1, further comprising:
a temperature sensor that is in communication with the at least one heating coil.

9. The system of claim 8, further comprising:
a system controller that is communicatively linked to each of the electric motor, the at least one heating coil, and the temperature sensor.

10. The system of claim 9, wherein the system controller includes a wireless communication unit.

11. The system of claim 10, wherein the wireless communication unit includes at least one of a radio transceiver, a Bluetooth transceiver or a WiFi transceiver.

12. The system of claim 10, further comprising:
a wireless thermostat device that is in communication with the communication unit.

13. The system of claim 12, wherein the wireless communication unit includes functionality for selectively controlling an operation of the heating device.

14. The system of claim 1, wherein the portion of the generated airflow comprises non-heated air and said non-heated air functions to cool the main body during an operation of the at least one heat coil.

* * * * *